(12) United States Patent
Fernandez

(10) Patent No.: US 6,629,509 B1
(45) Date of Patent: Oct. 7, 2003

(54) CAGES FOR PETS WITH CONTINUOUS SELF-WASHING, AUTOMATIC DRINKING PLACE WITH OXYGENATION AND IRRIGATION

(76) Inventor: Laura Soberon Fernandez, Calle San Luis Patosi No. 101, Colonia Del Valle (MX), 03100

(*) Notice: Subject to any disclaimer, the term of this patent is extended or adjusted under 35 U.S.C. 154(b) by 0 days.

(21) Appl. No.: 09/230,727
(22) PCT Filed: Jul. 25, 1997
(86) PCT No.: PCT/MX97/00018
§ 371 (c)(1), (2), (4) Date: May 28, 1999
(87) PCT Pub. No.: WO98/04122
PCT Pub. Date: Feb. 5, 1998

(30) Foreign Application Priority Data

Jul. 30, 1996 (MX) .................................................. 96295

(51) Int. Cl.[7] ............................................... A01K 31/00
(52) U.S. Cl. ........................................................ 119/452
(58) Field of Search ................. 119/416, 432, 119/442, 458, 459, 462, 463, 467, 479

(56) References Cited

U.S. PATENT DOCUMENTS 1,840,202 A * 1/1932 Kerr
3,269,358 A * 8/1966 Hawley
3,815,549 A * 6/1974 Opmeer
5,148,771 A * 9/1992 Schuett et al.
5,996,536 A * 12/1999 King ........................... 119/459

* cited by examiner

Primary Examiner—Thomas Price
(74) Attorney, Agent, or Firm—Howrey Simon Arnold & White LLP.; Carter J. White (57) ABSTRACT

This invention refers to cages for pets, at all existent or necessary sizes, depending on the pets' needs; it has recyclable hydraulic irrigation, at all and every one of its gratings, superiors, inferiors, and all its sides. One platform or tray (3), with irrigation to all its sides, vertical as well as horizontal, internal and external, that equally has recyclable hydraulic irrigation, with an orifice at the platform that is in an unevenness of the ground, for the exit of the water and the residues. It can also be directly connected with the hose pipes and make it work the same. It has a trash deposit (18), that accumulates it even for a week, it's located at the top of the water deposit. One automatic drinking place (15) for birds of water with oxygenation and an exit for its recovery. Roof with illumination and side curtains. All systems can be integrated for its function in just one cage or each one separately, as required.

1 Claim, 8 Drawing Sheets

CAGES FOR PETS WITH CONTINUOUS SELF-WASHING, AUTOMATIC DRINKING PLACE WITH OXYGENATION AND IRRIGATION

BACKGROUND

Pet cage design is traditionally restricted to a grill, tray and an entrance door. These cages do not feature any special qualities. They vary, mainly, in respect with different forms in their structure, roof, hanging and foot models, of differents sizes and differently knitted and widened meshes.

Today's cages do not solve the ecological and hygienic problems, taking a lot of time from the pet's owner in order to keep them clean. In the traditional tray, the excrement and waste produced by the mascot must be cleaned by hand using a brus. Residues pasted in the cage and its tray during the day, become hard to remove and produce pollution that adversely affects the pet's health as well as that of the family that inhabits the place. Because of this tradition, many people rather not have mascots, due to the problems related to the repugnant aspec of the cage and its cleaning.

Traditionally, the pet's bath is carried out by means of sprayers, bowls and other methods that affect the nature of the animal. It is hard to bathe the pet under these conditions, its habits cannot be changed and its natural genetic instinct, without causing severe trauma and stress becuse to he fear generated by this type of traditional bath.

Drinking troughs are all additional to the cages; with little or no protection in order to maintain the purity of the water, food residues and excrement make drinkable water unhealthy to drink for the pet.

The traditional cage does not count with an illumination system, nor does it have an obscuring method of their own, making these processes difficult when required by the mascot for its daily maintenance.

These are the inconveniences of traditional cages know a day in the market that have not been improved since their beginning.

INVENTION PURPOSES

The main goal of the cage system is to improve the permanence of pets at home within a cleaner, more pleasant and healthier environment in order to offer total cleanliness with minimal work, achieving more free time for the pet's owner and liberating him from all effort in regard with the pet's maintenance as well as improving decoration at home. The core of the system is to provide with ecological, hygienic and comfortable means for the pet as well as its owner. The system also uses state of the art technology in order to diminish risk of disease in its environment.

The cage general system features five basic sub-systems that develop independently or in conjunction according to the particular needs of every kind of pet.

Continuous automatic tray cleaning system. Continuously cleans excrement ad waste produced by the pet. This task would be unreachable by a human being. The system cleans the tray without the pet touching the water, thus liberating persons from this cleaning task, making it highly efficient and effective, with no waste of water, that is filtered and recycled.

Watering-can system. Based upon the nature of animal life, this type of bath does not produce stress or fear, but a true pleasure for the mascot. This new bathing method is carried out by means of rain or dripping in order to unify the animal with its nature. In its operation, it does not spill water outside the cage, and does not need special installations, because it does not affect the surrounding area. It may even be done over a carpet.

Automatic drinking trough with oxygenation system. With this system, the water quality is maintained healthy. Oxygen is administered in order to replace its loss during the process, recovering the remainder liquid from the drinking trough, bringing it back to its original deposit. It is designed in order for the pets not to dirty or defecate in the drinking trough. Vitamins and medicines may be supplied through the drinkable water deposit.

Illimination System. It allows attending the pet's needs; observing and/or exhibiting it at any time as required. It also allows the structure to be illuminated, making it a part of the decoration at home.

Night cover system. The pet requires to be deprived from the light during the night or under certain circumstances, achieving its isolation from light and giving it privacy for its rest.

| DETAILED LISTING BY NUMBER AND DRAWING. | | |
|---|---|---|
| Service compartmen | (1) | drw. (2) |
| Tray | (2) | drw. (6) |
| Continuous automatic tray cleaning water deposit | (3) | drw. (4) |
| Automatic tray cleaning water pump | (4) | drw. (4) |
| Waste collector | (5) | drw. (5) |
| Tray exit hole | (6) | drw. (6) |
| Tray watering pipes | (7) | drw. (6) |
| Waste collector internal grill | (8) | drw. (5) |
| Cage structure | (9) | drw. (1) |
| Automatic tray cleaning water filter | (10) | drw. (3) |
| Watering-can water deposit | (11) | drw. (7) |
| Watering-can water pump | (12) | drw. (7) |
| Watering-can water heater | (13) | drw. (7) |
| Watering-can pipes | (14) | drw. (8) |
| Bridge water deviation lever | (15) | drw. (7) |
| Watering-can pressure regulation faucet | (16) | drw. — |
| Cage roof | (17) | drw. (11) |

-continued

DETAILED LISTING BY NUMBER AND DRAWING.

| | | |
|---|---|---|
| Drinking trough drinkable water deposit | (18) | drw. (9) |
| Drinking trough drinkable water, water pump | (19) | drw. (9) |
| Drinking trough oxygen pump | (20) | drw. (20) |
| Drinking trough | (21) | drw. (10) |
| Drinking trough drinkable water supply pipe | (22) | drw. (10) |
| Drinking trough oxygen pipe | (23) | drw. (10) |
| Drinking trough remnant water recovery pipe | (24) | drw. (10) |
| Cage illumination | (25) | drw. (11) |
| Night cover | (26) | drw. (11) |

DETAILED DESCRIPTION OF THE INVENTION

Figure 1:
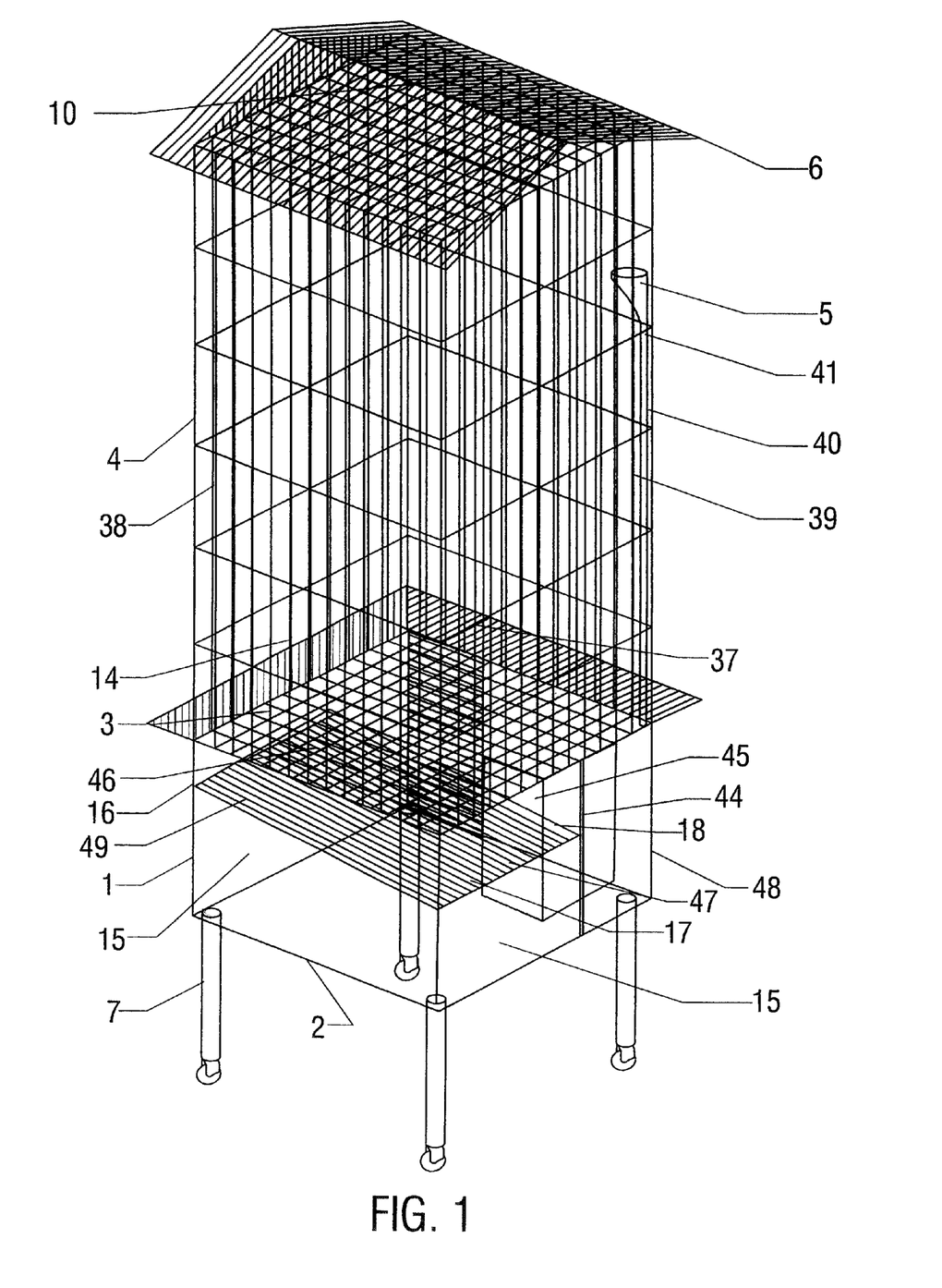
FIG. 1 is an isometric view of the cage structure.
Figure 2:
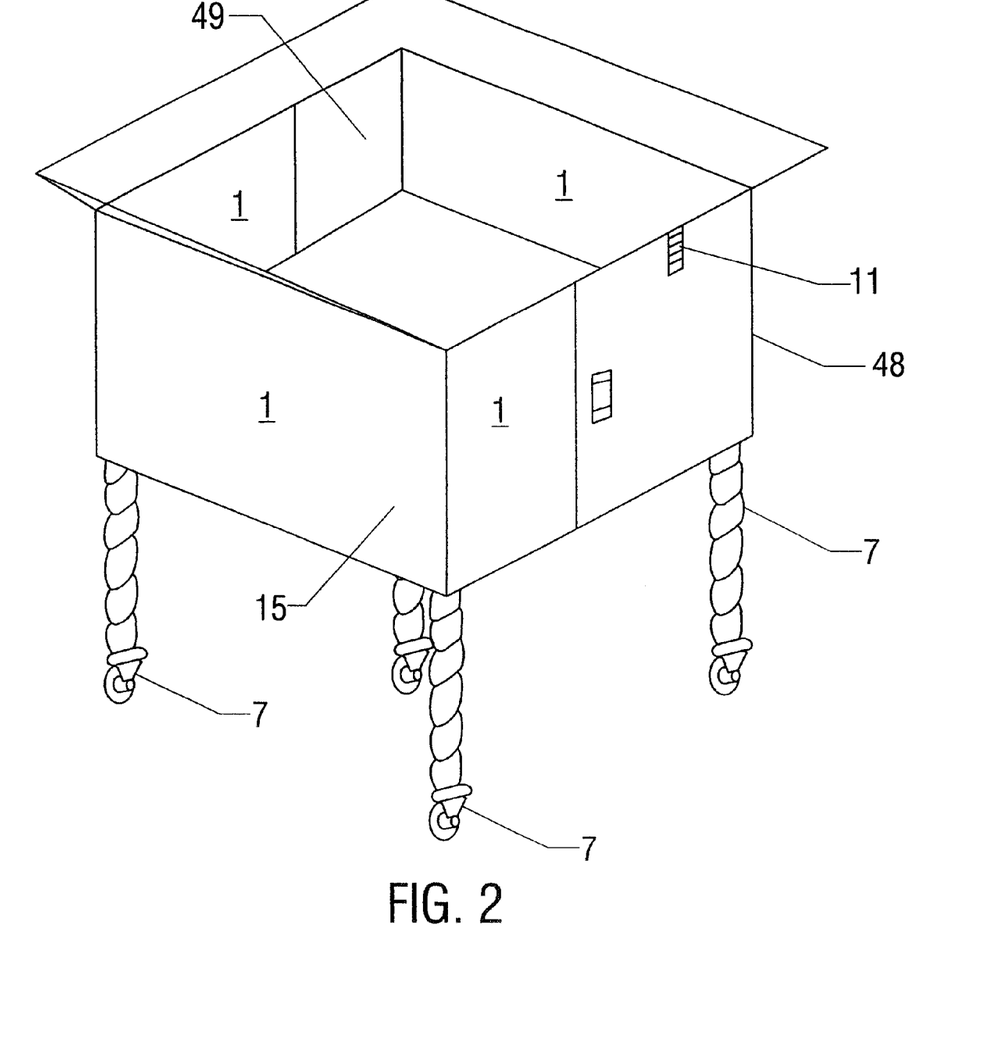
FIG. 2 is an isometric view of the exterior of the service compartment.
Figure 3:
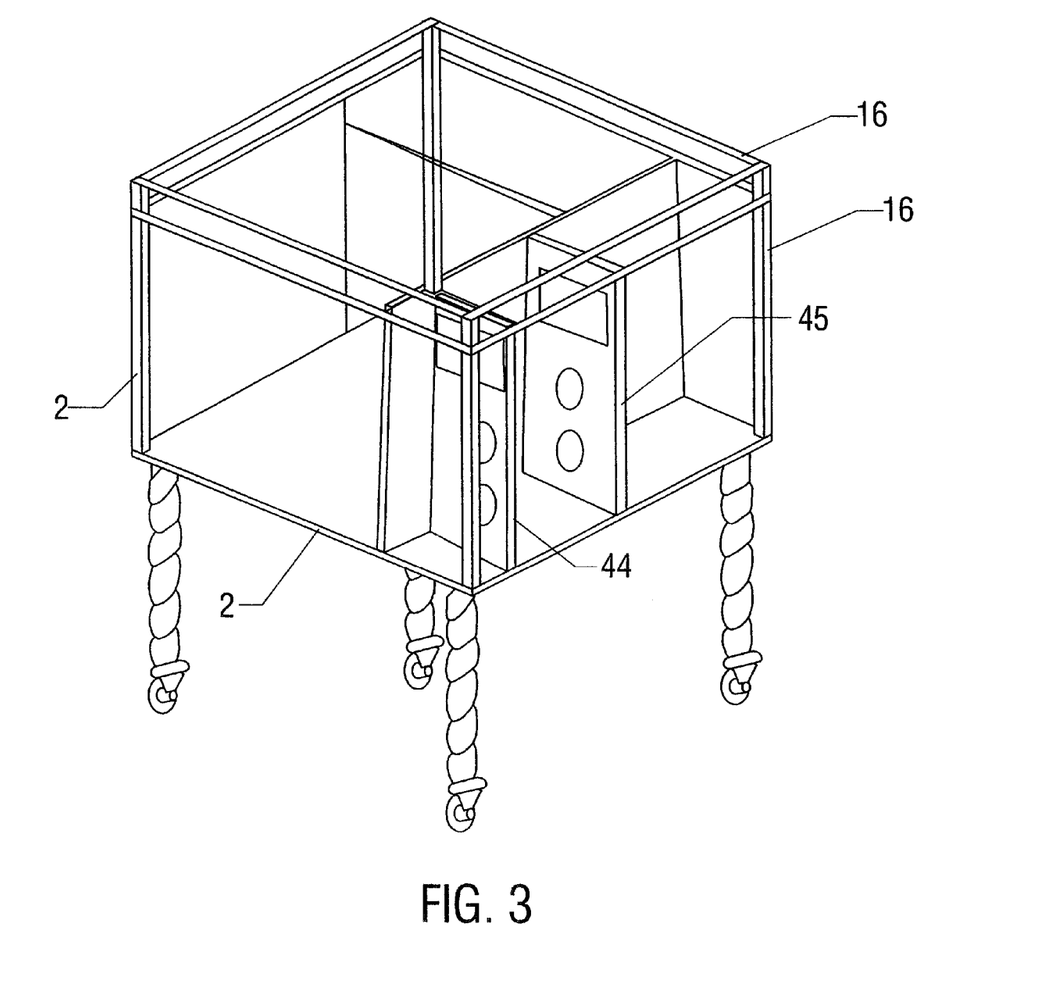
FIG. 3 is an isometric view of the interior of the service compartment.
Figure 4:
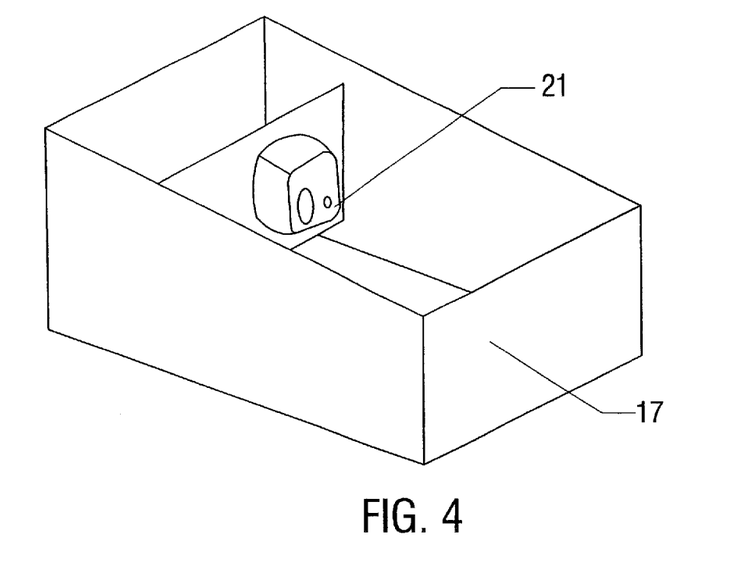
FIG. 4 is an isometric view of the waste water compartment.
Figure 5A:
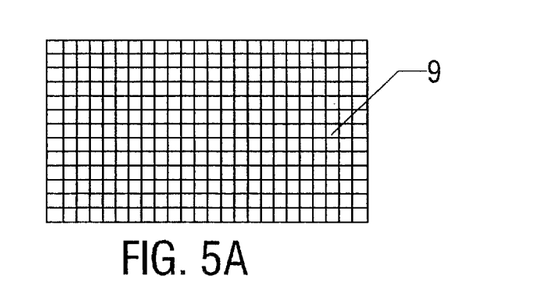
FIG. 5A is a top view of the screen for the waste tray.
Figure 5B:
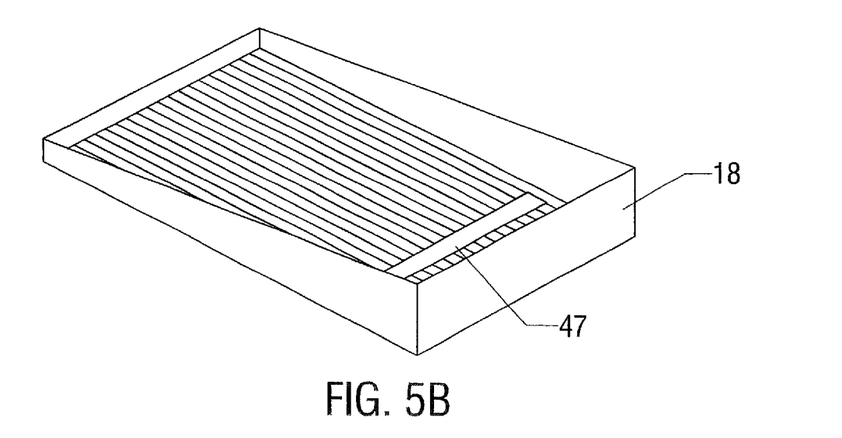
FIG. 5B is an isometric view of the waste tray.

The cage, as a whole, is formed by the parts described as follows:

The service compartmen (1) is located at the bottom part of the structure of the cage (9), but may be, sometimes, exterior to the structure of the cage (9), as required. This compartment, within, contains alle the service systems of the cage.

Continuous automatic tray cleaning system. Is constituted by a tray (2) that receives the excrement and waste produced by the pet. The tray (2) is located, fixedly, over the service compartment (1). The tray (2) contains, conveniently distributed, watering pipes (17), hidden or exposed, by means of which water circulates in a continuous manner by means of a water pump (4), that is locatec according to the type of water pump selected (submergible, external or direct from the water source), therefor a convenient spot is assigned to it according to its utilisation. The pump (4), makes clean water from the deposit (3) and filter (10) circulate to the tray (2), dragging and retrieving,excrement and waste towards the exit hole (6), located at the centre of the tray (2), and finally to the waste collector (5), located underneath the exit hole (6), through the grill (8) that separates excrement and waste from dirty water thaht continues to circulate towards the water filter (10). The group composed by the grill (8), the cleaning water deposit (3) and the tray (10) water filter, are independent buy work sequentially and are in the service compartment (1). The filter (10) is composed by (grills, active carbon, silica and different in thickness). The continuous automatic tray cleaning system is only turned off while operating the watering-can.

All the water deposits and its systems are independent amongst themselves.

Figure 6:
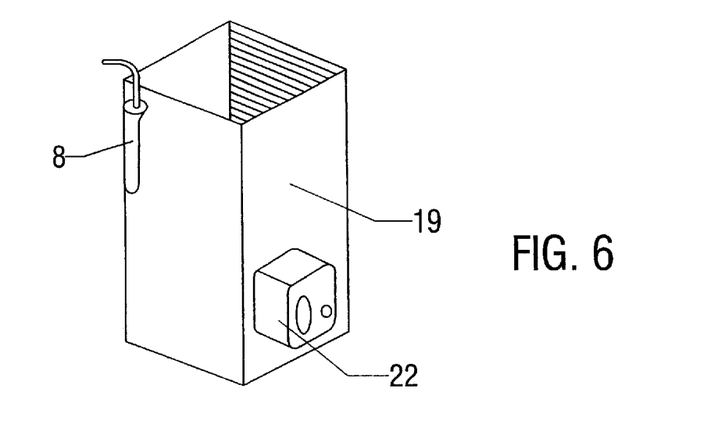
FIG. 6 is an isometric view of a first embodiment of the watering can.
Figure 7:
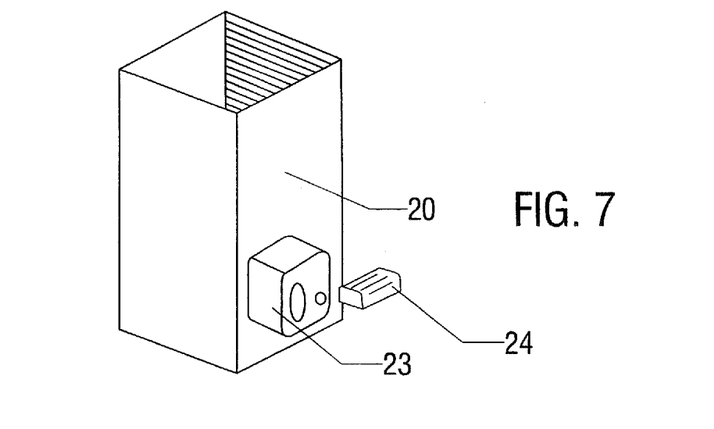
FIG. 7 is a second isometric view of a second embodiment of the watering can
Figure 8A:
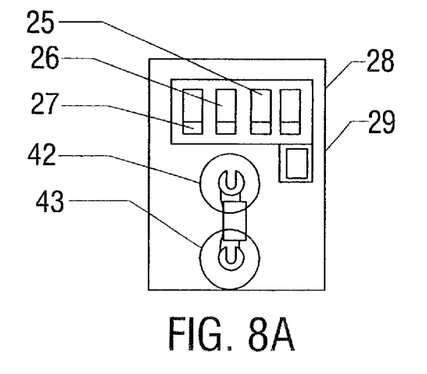
FIGS. 8A & B are a views of the control panel.
Figure 8B:
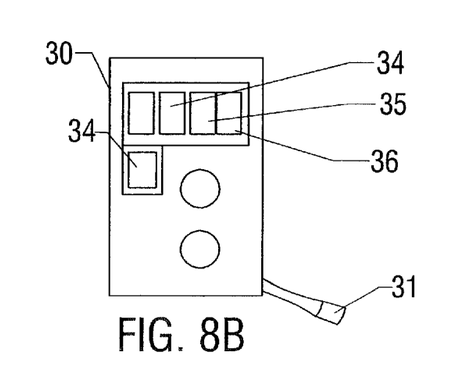

Watering-can system. This system is formed by small orifices conveniently distributed throughout the structure (9) and the roff (17), where the bathing of the pet is achieved, basically. The orifices of the structure of the cage (9) are mainly supportive. Simultaneously the cage structure (9) is cleaned. The water circulating for the bath comes from the watering-can water deposit (11), this water deposit and all the other components of the watering-can are located in the service compartment (1), by means of a water pump for the watering-can (12) that is located according to the kind of water pump selected (submergible, external or direct from the water supply), is designated to an adequate place in order to be utilised. The pressure of the water is controlled by means of a faucet (16). Previous to the bath, the water heater (13) should be turned on, in order for the temperature to be adequate, and should be turned off before other task is carried out. The water heater (13) is located in the watering-can deposit (11). It is necessary to activate the bridge lever (15) in order to deviate the water from the watering-can to the watering-can water deposit (11), preventing it from going into the automatic tray cleaning water deposit (3). Once the bathing task has been successfully carried out, the watering-can water pump (12) should be turned off and the bridge lever (15) deactivated in order to re-establish the continuous automatic tray cleaning system, that was turned off in order to start the bathing process.

Figure 9A:
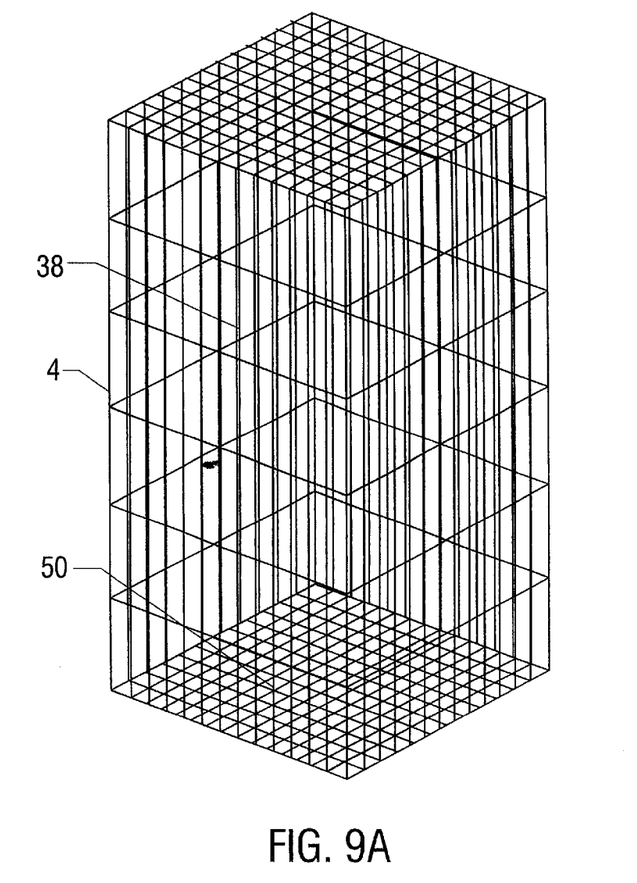
FIG. 9A is an isometric view of the cage.
Figure 9B:
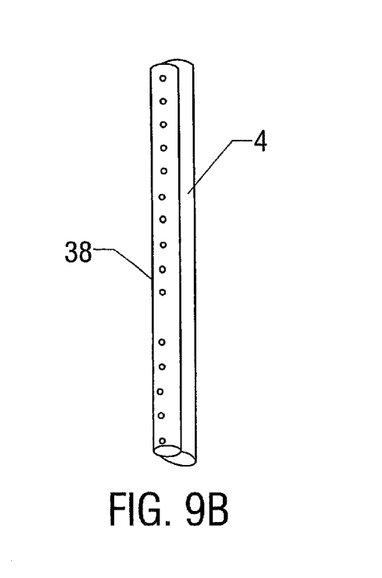
FIG. 9B is an isometric view of the piping associated with the cage
Figure 10:
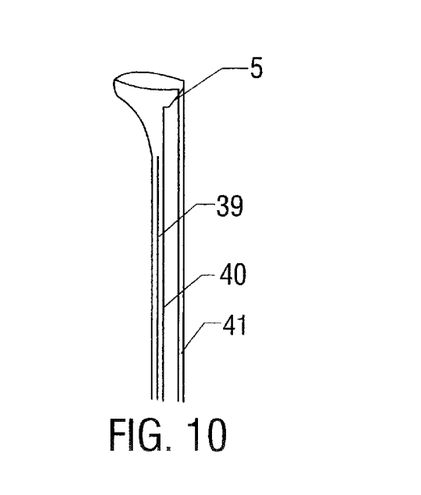
FIG. 10 is a partially cutaway view of the fresh water pipe

Automatic drinking trough with oxigenation system. It is obtained by means of the installation of a drinkable water deposit (18) located in the service compartment (1), where water circulates by means of the water pump (19) that is located depending on the type of water pump selected (submergible, external or direct from the water supply), it is designated to an adequate location. The water pump (19) sends water through the drinkable water pipe (22) to the drinking trough (21) located in the superior part of the middle of the cage structure (9). The remnant water of the drinking trough (21) is recovered by means of a recovery pipe (24) and taken back to the drinking trough water drinkable water deposit (18). There es an oxygen pump (20) located externally to the drinking trough drinkable water deposit (18), which pours oxygen through an oxygenation pipe (23) to the drinking trough (21) directly. Drinkable water is maintained in movement permanently, oxygenated and making it more hygienic. It may also be filtered (with an additional independent. The drinking trough (21) is designed in order not to be exposed to the pet's excrement and waste. Vitamins and medicines may be administered directly through the drinking trough drinkable water deposit (18) without loss thanks to the recover system.

Figure 11:
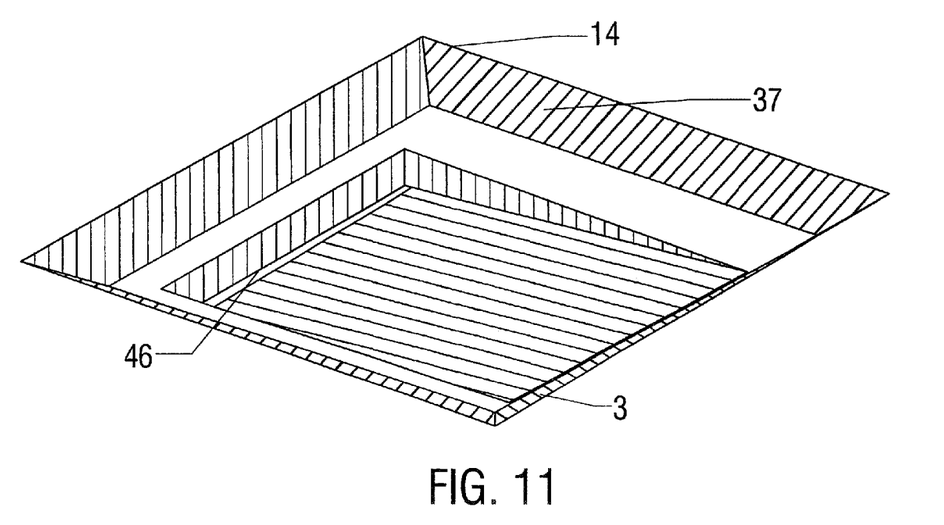
FIG. 11 is an isometric view and FIG. 11A is a side view of the platform upon which the cage is positioned.
Figure 11A:
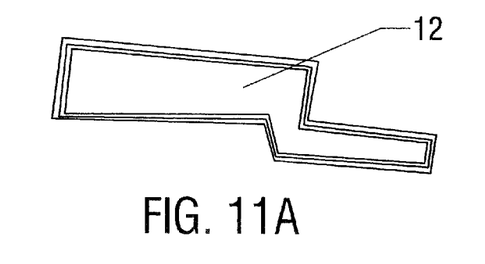

Illumination system. The illumination system (25) is located in the superior part of the roff (17) and allows attending the pet's needs, observe it and/or exhibit it as required. It also illuminates the cage structure (9) for decorative matters.

Figure 12:
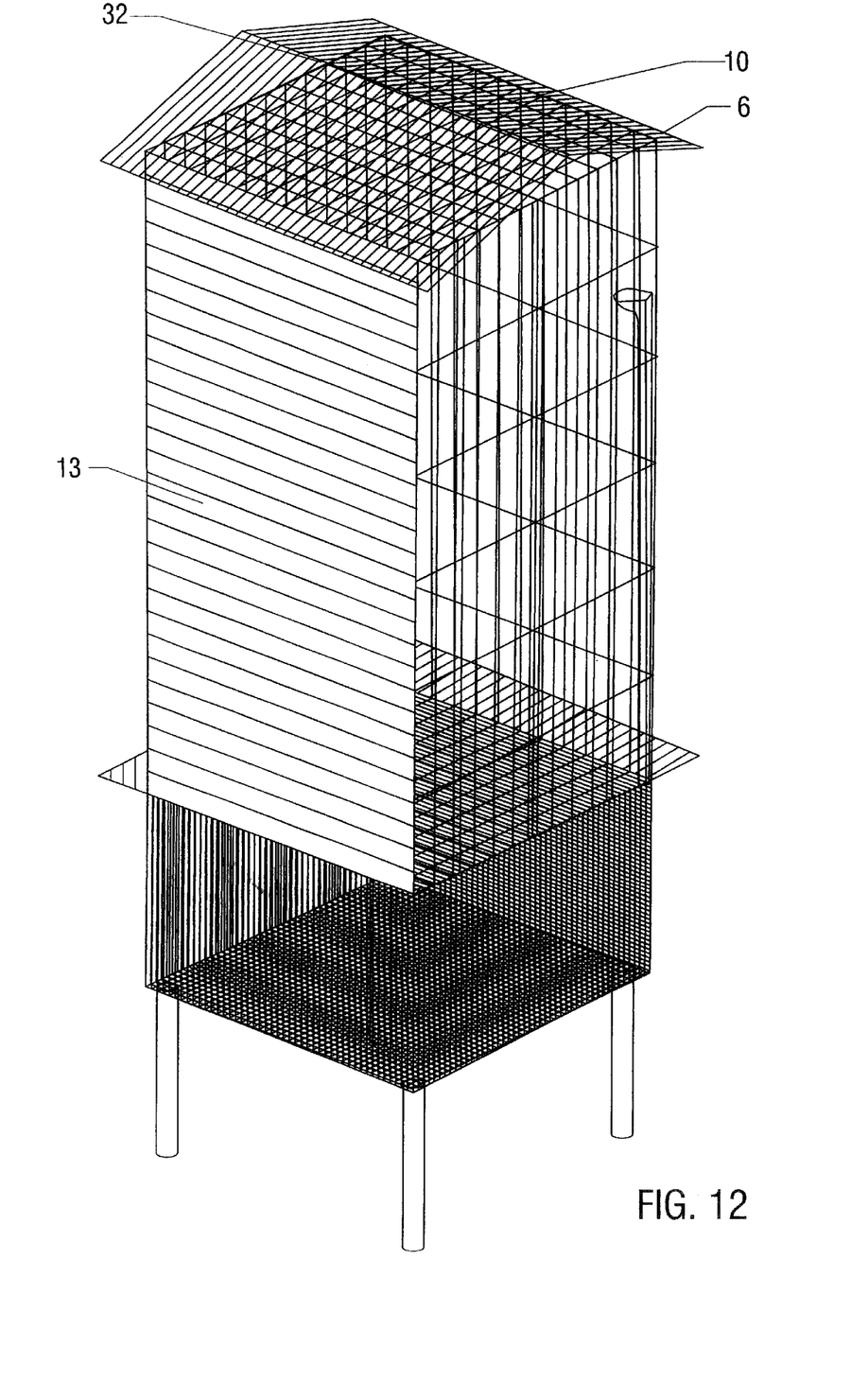
FIG. 12 is an isometric view of the cage including a night cover.

Night cover system. Covers the cage structure (9) during the night or under certain circumstances, with to night cover (26) for the structure that may feature blinds curtains or similar elements, in order to achieve isolation from light of the pet, giving it privacy in order for it to rest.

These light isolation elements are located from the roff (17) to the base of the cage structure (9), on all its sides.

SUMMARY

Continuous automatic tray cleaning pet cage with watering can, automatic drinking trough with oxygenation, illumination and night cover.

The integral system of the cage contains five basic sub-systems, independent amongst themselves, but the cage may contain one or several of the sub-systems regardless of the others, all of them together conforming the "GENERAL SYSTEM OF THE SELECTED CAGE".

Automatic continuous tray cleaning system. Cleans excrement and waste produced by the pet continuously. The system cleans the tray without having the pet touch the water.

Watering can system. It operates by means of rain or dripping to unify the animal with its nature. In its operation it does not spill water to the exterior of the cage, and does not require special facilities, its structure forms the watering can. Automatic drinking trough with oxygenation. Oxygen is administered to supply its loss during the process, recovering water remnants from the drinking trough and takin it back to its original deposit. Medicines and vitamins may be administered in the drinkable water deposit.

Illumination system. Allows attending the needs of the pet, observe it or exhibit it at any time as required. It also illuminates the cage structure for decorative matters.

Night cover system. The pet requires to be deprived from light during the night or under certain circumstances, achieving its isolation from light and its privacy for its rest.

Having sufficiently described my cage, I consider it as a novelty and therefor I claim as my property the aforementionend clauses:

1. A cage for a pet, comprising:

a cage structure including a cage structure bottom panel, one or more cage structure side panels and a cage structure top panel, the cage structure panels being positioned so as to form an enclosed area for the pet, wherein the cage structure bottom panel is permeable to the pet's waste;

a waste tray including a waste tray bottom panel and one or more waste tray side panels, the waste tray panels forming the waste tray, said waste tray being functionally positioned under the cage structure bottom panel so as to capture the pet's waste, and wherein the waste tray bottom panel has an opening therein;

a service compartment, the service compartment having a service compartment bottom panel and one or more service compartment side panels, said service compartment panels being positioned to form an enclosure having an open top, wherein said open top of the service compartment is shaped such that the waste tray and cage structure for the pet are supported from below by said service compartment;

an automatic waste tray cleaning system for flushing with water the waste tray, said automatic waste tray cleaning system including: a water circulating pump for pumping water, said water circulating pump having an input and an output;

waste tray watering pipes connected to the output of the water circulating pump, said waste tray watering pipes being positioned within the waste tray so as to flush the waste tray with water thus washing the pet waste from the tray and out the opening in the bottom panel of said waste tray;

a waste collection screen, said screen being positioned such that the water and pet waste washed from the waste tray is filtered of solid pet waste;

a waste Water depository, said depository being positioned so as to capture the water passing through said waste collection screen;

a waste water filter, said filter being in fluid connection with the waste water depository and further connected to the input of the water circulating pump, said water filter being capable of cleaning said waste water for reuse in flushing the waste tray.

\* \* \* \* \*